July 25, 1950          J. F. DAUKUS          2,516,451

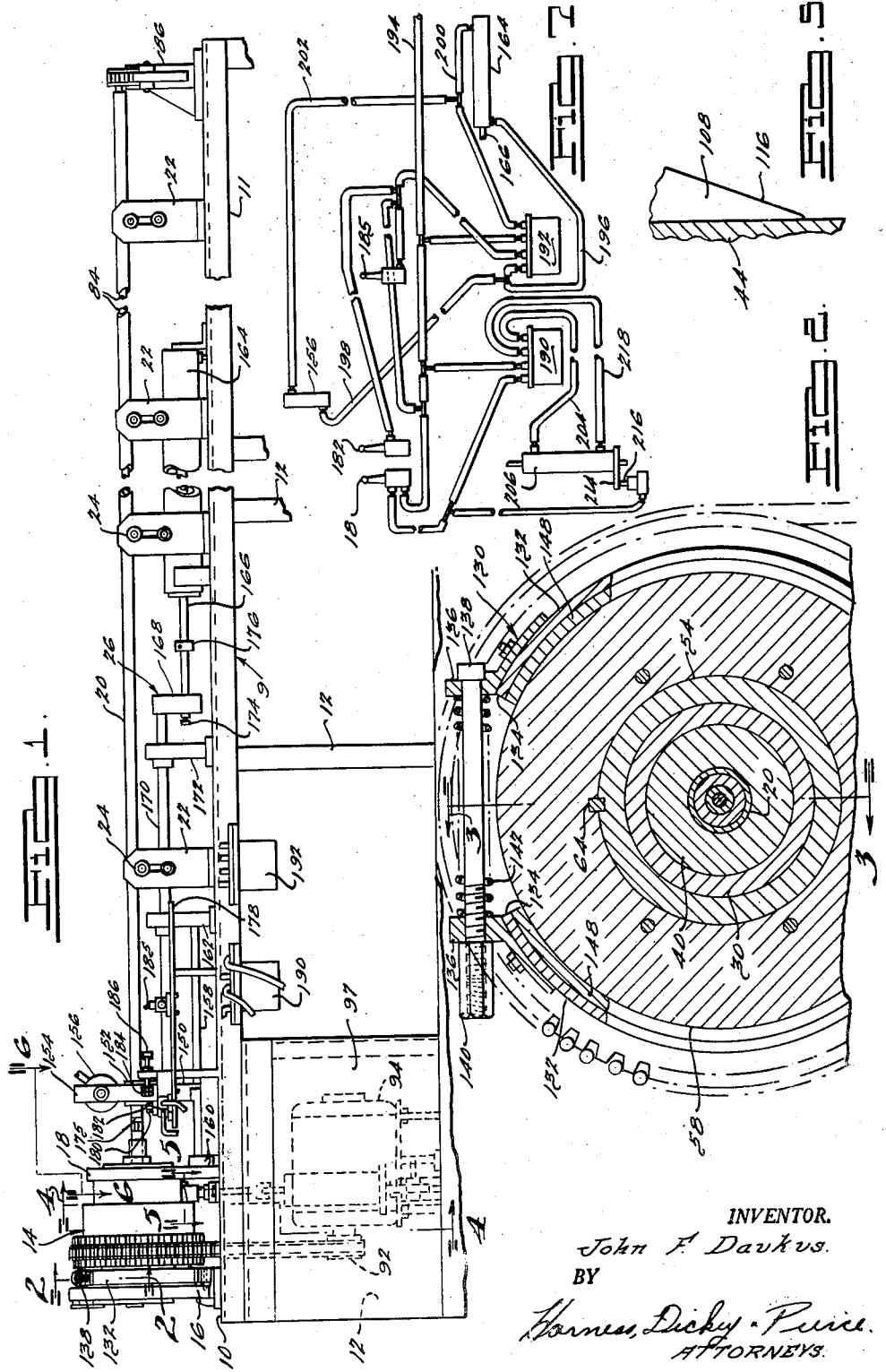

PIPE AND TUBE SHEARING MECHANISM

Filed Jan. 7, 1948          2 Sheets-Sheet 2

INVENTOR.
John F. Daukus.
BY
Harness, Dickey & Pierce.
ATTORNEYS.

Patented July 25, 1950

2,516,451

UNITED STATES PATENT OFFICE 2,516,451

PIPE AND TUBE SHEARING MECHANISM

John F. Daukus, Detroit, Mich., assignor, by mesne assignments, to McKay Machine Co., Youngstown, Ohio, a corporation of Ohio Application January 7, 1948, Serial No. 886

6 Claims. (Cl. 164—40)

This invention relates to a shearing mechanism for cutting pipe or tubing. More particularly this invention relates to shearing mechanism of the single stroke type having a longitudinally extending pipe space and stationary and movable shearing units adapted to shear the pipe or tubing along a plane extending transversely of the pipe space.

The present invention contemplates the provision of an improved shearing mechanism of an improved design affording an extremely compact mechanism which is simple and economical of construction and which is reliable and efficient in operation.

It is an object of the present invention to provide an improved shearing mechanism wherein improved, simple and compact means are provided for moving the movable shearing unit thereof.

Other and more detailed objects of the invention will become apparent from the following specification, the appended claims, and the accompanying drawings, wherein:

Figure 1 is a broken view in elevation of a shearing mechanism embodying the invention;

Fig. 2 is an enlarged broken sectional view of the structure illustrated in Fig. 1 taken along the line 2—2 thereof;

Fig. 6 is a broken plan view of the structure illustrated in Fig. 1 taken along the line 6—6 thereof; and Fig. 7 is a circuit diagram of the pneumatic circuit of the shearing mechanism illustrated in Fig. 1.

Figure 3:
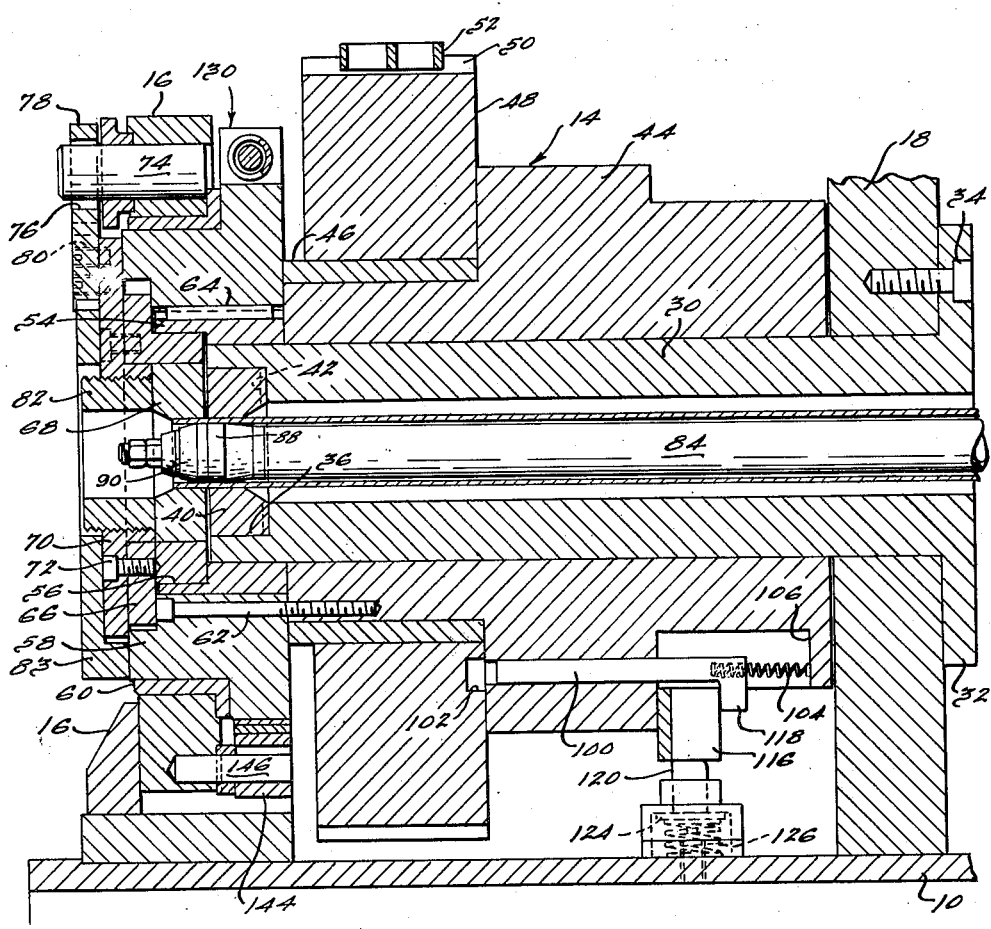
Fig. 3 is a longitudinal sectional view of the structure illustrated in Fig. 2 taken along the line 3—3 thereof.

Referring to the drawings, the shearing mechanism comprises a frame 9, including a rectangular platform 10 at its front or left hand end, as viewed in Fig. 1, and a pair of conventional angle irons 11 extending rearwardly therefrom. The frame 9 is supported on suitable legs 12 which may be welded or otherwise suitably secured thereto. A shearing assembly 14 is mounted on supporting members 16 and 18 which are welded or otherwise suitably secured to the platform 10. The angle irons 11 extend for a considerable distance rearwardly of the shearing assembly 14 to provide an elongated pipe space in which a pipe or tubing 20 may be supported while being cut in the shearing mechanism. For supporting the pipe 20 in the proper aligned position for cutting in the shearing assembly 14, pairs of longitudinally spaced supporting blocks 22 are welded or otherwise suitably secured to the frame 9 and provided with rollers 24 journaled therein for engaging the pipe 20. Rearwardly of the shearing assembly 14 the frame 9 also serves to support the pipe feeding mechanism 26 which feeds the pipe 20 through the shearing assembly 14 as hereinafter described.

Considering the shearing assembly 14 in greater detail and referring to Fig. 3, a horizontally disposed generally tubular shaft 30 projects through the supporting member 18 and is provided at one end with a radially outwardly extending flange 32 which is secured to the supporting member 18 by a plurality of screws 34. At its front or left-hand end as viewed in Fig. 3, the shaft 30 has a concentric cylindrical recess 36 extending axially inwardly from its front end in which is received a stationary external die 40. The abutting axial faces of the stationary die 40 and the shaft 30 are formed to provide a key and groove engagement as at 42 extending transversely thereof to securely hold the die 40 against rotation relative to the shaft 30.

Forwardly of the supporting member 18 a sleeve member 44 is rotatably mounted on the shaft 30 and is provided adjacent its forward end with a bearing 46 upon which is rotatably mounted a flywheel 48, the outer periphery of which is provided with gear teeth 50 for engagement with a driving chain 52. A cylindrical cam member 54 is rotatably mounted on the forward end of the stationary shaft 30 and has an eccentric cylindrical recess 56 extending axially rearwardly from its front end. The front end of the stationary shaft 30 is supported on the above-mentioned supporting member 16 by means of an annular member 58 which surrounds the cam member 54 and is journaled in a bearing 60 mounted in the supporting member 16. The annular member 58 is connected to the sleeve member 44 for rotation therewith by a plurality of screws 62 and drives the cam member 54 through a key 64.

A hollow cylindrical movable die holder 66 is rotatably received in the above described recess 56 formed eccentrically in the outer end of the cam member 54 and carries a movable external die 68. The die holder 66 is secured to a pivot plate 70 by a plurality of screws 72 and during the eccentric motion of the movable die and die holder the assembly including the pivot plate, the die holder and the movable die is held against continuous rotation by a pivot pin 74, which is fixed in the upper portion of the supporting member 16 and received through an enlarged aperture 76 formed in an upwardly extending arm 78 secured to the pivot plate 70 by a plurality of screws 80. The diameter of the aperture 76 is sufficiently larger than the diameter of the pin 74 to permit the eccentric motion of the movable die assembly imparted thereto by the cam member 54.

It will be appreciated that the amount of eccentricity imparted to the outer movable die assembly by the cam member 54 is dependent upon the eccentricity of the cylindrical recess 56 formed in the cam member 54 and that any desired amount of eccentric movement of the movable die assembly may be obtained by the proper construction of the cam member 54.

In the construction illustrated in the drawings, the external dies 40 and 68 are annular in shape and are adapted for shearing pipe or tubing of circular cross section. It will be appreciated that in this construction only a minimum of eccentric motion is required to effect a shearing of the pipe or tubing. It will also be appreciated that the dies 40 and 68 may be readily replaced with other dies of the same external diameter, but having different internal diameters adapted to receive and shear pipe or tubing of different sizes. The shearing mechanism may also be used for shearing tubing of cross sections other than circular, including oval and square tubing in which event, the dies 40 and 68 are replaced by dies of the same external diameter and having central openings adapted to receive and fit the tubing to be cut. It will be appreciated that in cutting tubing of cross sections other than circular, a greater amount of eccentric movement of the movable die assembly will be required.

The movable die 68 is held in the proper axial position by an annular plug 82 threadedly mounted in the pivot plate 70 and adjustable to accurately position the movable die 68. The pivot plate 70 is held against axial movement by a cover plate 83, which is secured to the supporting member 16 by a plurality of screws (not shown).

A mandrel 84 receives the tubing 20 to be cut and is suitably connected at its rear end to a supporting member 86 welded or otherwise suitably secured to the frame 9 at the rear or right-hand end thereof as viewed in Fig. 1. The mandrel may be connected to the supporting member 86 by any suitable means permitting the mandrel to be accurately located longitudinally of the frame 9. At its opposite end, the mandrel 84 extends through the tubular shaft 30 and includes an internal stationary die element 88 and a movable internal die element 90 mounted on the front end thereof. The above mentioned accurate locating of the mandrel 84 longitudinally of the frame 9 is required in order that the shearing plane formed by the abutting faces of the stationary and movable internal die elements may be made to coincide with the shearing plane defined by the abutting faces of the external dies 40 and 68. The details of construction of the mandrel 84 and the internal die assembly are preferably as shown and described in United States Letters Patent No. 2,435,469 to Elston A. Roop, issued February 3, 1948.

The chain 52 through which the flywheel 48 is driven may be connected to any suitable source of power and in the construction illustrated it is driven from the output shaft 92 of an electric motor 94 which may be mounted on any suitable support 96. In the construction illustrated, the motor 94 is disposed below the platform 10 in a rectangular housing 97.

Figure 5:
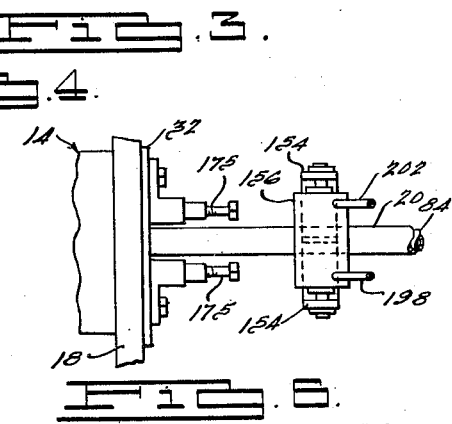
Fig. 5 is a fragmentary sectional view of the structure illustrated in Fig. 1 taken along the line 5—5 thereof.

The sleeve member 44 is selectively connected to the flywheel 48 for rotation therewith by an axially extending pawl 100 adapted, when in its forward position, to project into one of a plurality of recesses 102 formed in the rear axial face of the flywheel 48 and thereby lock the sleeve member 44 and the flywheel 48 together for rotation as a unit. The pawl 100 is biased toward its forward or engaged position by a spring 104 mounted in a recess formed in the rear end of the pawl and projecting rearwardly therefrom to engage a cooperating forwardly presenting axial surface 106 formed on the sleeve member 44. The pawl 100 is normally held in the retracted or disengaged position shown in Fig. 3, by a cam arm 108 pivotally mounted at 109 on an adjustable plate 110 which is secured to the supporting member 18 by a pair of screws 112 which extend through a generally vertically disposed elongated slot 114 formed in the plate 110 and are threaded into the supporting member 18. The cam arm 108 is provided adjacent its outer end with a cam surface 116, best illustrated in Figs. 3 and 5, adapted to engage a depending projection 118 integrally formed on the pawl 100, during rotation of the sleeve member 44, and move the pawl 100 to the withdrawn or disengaged position illustrated in Fig. 3.

Figure 4:
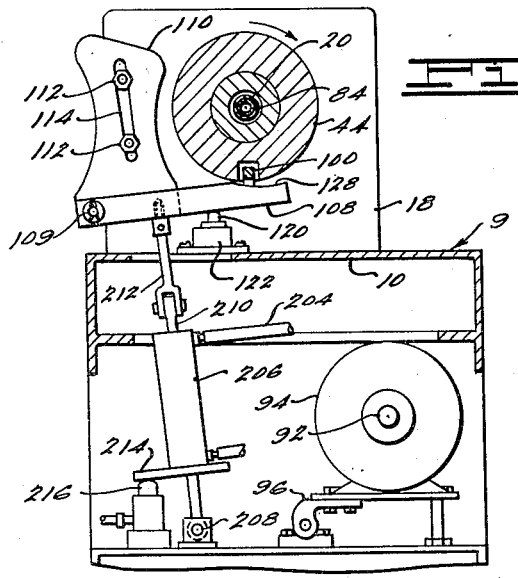
Fig. 4 is an enlarged transverse sectional view of the structure illustrated in Fig. 1 taken along the line 4—4 thereof.

The cam arm 108 is normally held in its upper or engaged position as illustrated in Figs. 3 and 4, by a spring pressed plunger 120 which is vertically disposed and mounted in a spring housing 122 secured to the frame 9. The plunger 120 is provided with an annular collar 124 against which a spring 126 acts to bias the plunger 120 toward its upward position.

The upper surface of the cam arm 108 is curved as indicated at 128, in Fig. 4, on an arc eccentric to the adjacent surface of the sleeve member 44. It will be appreciated that by thus forming the arcuate surface 108, the point in the rotation of the sleeve member 44 at which the pawl 100 is withdrawn by the cam arm 128 may be varied by changing the position of the plate 110 vertically of the member 18, as permitted by the slot 114. As the plate 110 is lowered, the cam arm 108 is made to pivot about the plunger 120 so that the cam arm 108 will engage the pawl 100 at an earlier point in the rotation of the sleeve member 44. Conversely, by raising the plate 110 the cam arm 108 will be pivoted in the opposite direction and made to engage and withdraw the pawl 100 at a later point during the revolution of the sleeve member 44.

It is important that at the end of each cutting operation the cam member 54 by which the movable die 68 is moved eccentrically of the stationary die 40, be stopped in a position in which the die 68 is accurately aligned with the die 40 to permit the tubing 20 to be moved forward preparatory to the next shearing operation without interference by the movable die. To insure that the cam member 54 will be stopped in the desired rotative position, a brake mechanism generally designated 130 engages the annular member 58 to which the cam member 54 is keyed for rotation therewith. Referring to Fig. 2, the brake mechanism 130 comprises a brake band 132 having spaced ends 134 upon which are mounted clamping brackets 136 which are apertured to receive a through bolt 138 provided with a nut 140 by means of which the braking pressure may be adjusted. A coil spring 142 preferably surrounds the bolt 138 intermediate the brackets 136 and engages the latter at its opposite ends to insure that an unthreading action of the nut 140 will result in a corresponding separation of the brackets 136 and decrease of the braking pressure. Intermediate its ends 134 the brake band 132 carries a bracket 144 (see Fig. 3) which is pivotally mounted on a pin 146 fixed in the supporting member 16. The brake band 132 is preferably provided with a brake lining 148 formed of any suitable material.

The brake 130 continuously grips the member 58 and is effective, upon the withdrawal of the pawl 100 from engagement with the flywheel 48 by the action of the cam arm 108, to stop rotation of the member 58. By adjusting the braking pressure by means of the nut 140 and by adjusting the rotative position at which the cam arm 108 is effective to withdraw the pawl 100, by adjusting the plate 110 as described above, the movable die 68 may be made to come to rest in accurate alignment with the stationary die 40.

In the broader aspects of the present invention, the tubing 20 which is to be cut may be fed to the shearing assembly 14 either manually or by any suitable mechanism. The above mentioned feeding mechanism 26 employed in the preferred embodiment illustrated automatically feeds the tubing 20 for accurately cutting it into a plurality of pieces of equal length.

The feeding mechanism 26 comprises a carriage 150 including jaws 152 adapted to grip the pipe or tubing 20 and upwardly projecting spaced arms 154 suitably connected to the jaws 152 and adapted to be actuated by an air cylinder 156 to effect a gripping and releasing of the tubing 20 by the jaws 152. The carriage 150 is slidably mounted on a guide rod 158 disposed parallel to the mandrel 84 and supported in brackets 160 and 162 mounted on the frame 9 rearwardly of the shearing assembly 14. Movement of the carriage 150 is effected by an elongated pneumatic cylinder 164 mounted on the frame 9 rearwardly of the bracket 162 and having a forwardly projecting piston rod 166 connected to the carriage 150 through an arm 168 and a rod 170. The rod 170 is slidably supported in the bracket 162 and another supporting bracket 172. The arm 168 carries a stop 174 adapted to engage the supporting bracket 172 when the carriage 150 is at the forward limit of its travel. A pair of stops 175 mounted at the rear of the shearing assembly 14 on the flange 32 are adjusted to engage the carriage 150 simultaneously with the engagement of the bracket 172 by the stop 174 and cooperate therewith in determining the forward limit of movement of the carriage 150. The piston rod 166 carries a collar stop 176 adapted to engage the forward end of the cylinder 164 when the carriage 150 is at the desired rear limit of its travel. It will be appreciated that this collar stop 176 may be so adjusted that the rear limit of travel of the carriage will correspond to any desired length into which it is desired to cut the tubing 20.

A valve platform 178 is mounted on the frame 9 adjacent the guide rod 158 and carries at its forward end a pair of valves 180 and 182 adapted to be engaged by a pair of forwardly projecting stops 184 mounted on the carriage 150. Rearwardly of the valves 180 and 182 the valve platform 178 carries a valve 185 adapted to be engaged by a rearwardly projecting stop 186 mounted on the carriage 150 when the latter is at the desired rearward limit of its travel. These valves form a part of the pneumatic control system illustrated in Fig. 7 and described below. The stops 184 and the stop 174 are adjustable and are set so that the valves 180 and 182 are actuated by the stops 184 at the proper time so that the forward limit of movement of the carriage 150 will be determined by the simultaneous engagement of the stops 174 and 175 with the bracket 172 and the carriage 150, respectively. It will be appreciated that the length of the pipe to be cut is determined by the positioning of the collar stop 176 on the piston rod 166. It will also be appreciated that the positioning of the valve 185 must correspond to that of the collar stop 176 and be such that the valve 185 is actuated by the stop 186 at the proper time relative to the engagement of the collar stop 176 with the forward wall of the cylinder 164 at the rearward limit of movement of the carriage 150.

A pair of conventional valve boxes 190 and 192 is mounted on the frame 9 and is connected by pneumatic lines in accordance with the circuit diaphragm illustrated in Fig. 7. Considering the operation of this pneumatic control mechanism and commencing for purposes of illustration at a time when the carriage 150 is approaching the rear limit of its movement, the air pressure from the supply line 194 acts through the box 192 and the line 196 to force the piston of the cylinder 164 rearwardly, and thereby moving the carriage 150 toward its rear limit. At the same time, the air pressure is acting from the line 196 through a line 198 to the air cylinder 156 to hold the arms 154 in a position in which the jaws 152 are free of the pipe 20. When the valve 185 is actuated by the stop 186, the application of air pressure to the cylinders 164 and 156 is reversed, the line 196 being cut off and pressure being applied to the rear of the cylinder 164 through a line 200, and to the opposite end of the cylinder 156 through a line 202. This causes the jaws 152 to grip the pipe 20 and the carriage 150 to be moved forwardly by the piston rod 166. As the carriage 150 reaches the forward limit of its travel, the valves 180 and 182 are actuated by the stops 184. The actuating of the valve 182 again reverses the application of pressure to the cylinders 164 and 156 causing the jaws 152 to release their grip on the pipe 20 and the carriage 150 to commence its movement rearwardly.

Simultaneously with the actuation of the valve 182, the operation of the valve 180 applies air pressure from the supply line 194 through the box 190 and a line 204 to the upper end of a clutch actuating cylinder 206. At its lower end the cylinder 206 is pivotally mounted in a supporting member 208 and at its upper end a piston rod 210 projects outwardly therefrom and is connected by a link 212 to the cam arm 108 intermediate its pivotal connection at 109 to the plate 110 and the cam surface 116 formed at its outer end. It will now be appreciated that application of air pressure through the line 204 to the upper end of the cylinder 206 as above described will pull the cam arm 108 downwardly against the action of the spring pressed plunger 120 releasing the pawl 100 which engages the flywheel 48 causing the sleeve member 44, in which it is carried, to rotate with the flywheel. This downward movement of the piston rod 210 causes the cylinder 206 to pivot in a counterclockwise direction as viewed in Fig. 4, toward the pivot point 109, During this pivotal movement, an outwardly projecting arm 214 mounted on the cylinder 206 actuates a valve 216 which reverses the application of air pressure to the cylinder 206 closing off the line 204 and causing air to be supplied through the valve box 190 and a line 218 to the lower end of the cylinder 206 to urge the cam arm 108 to its upper or engaged position illustrated in the drawings. It will be appreciated that the air pressure acting to return the cam arm 108 as above described is supplemented by the action of the spring pressed plunger 120 described above. The combined effect of the air and spring pressures is to return the cam arm 108 to its upper position before one complete revolution of the sleeve member 44. Accordingly, it will be appreciated that the projection 118 on the pawl 100 will be engaged by the cam surface 116 on the cam arm 108 as one revolution of the sleeve member 44 is completed, thereby withdrawing the pawl 100 and permitting the brake 130 to stop the rotation of the cam member 54 and consequently, the movement of the movable die 68.

Suitable on and off controls (not shown) for the electric motor 94 and the air supply through the line 194 may be provided. From the foregoing it will be understood that when both of these controls are in the on position, the shearing mechanism will continue to feed and cut the pipe into pieces of the desired length so long as there is pipe on the mandrel.

While only one embodiment of the invention has been illustrated and described in detail, it will be readily appreciated, by those skilled in the art, that numerous modifications and changes may be made without departing from the spirit of the invention or from the scope of the appended claims.

What is claimed is:

1. A shearing mechanism for cutting tubular members comprising a frame, a stationary external die, means mounting said die on said frame, a movable external die mounted on said frame for movement eccentrically of said stationary die, a flywheel disposed coaxially with said stationary die and having an opening axially thereof adapted to receive therethrough a tubular member to be cut, motive means for driving said flywheel, means including clutch means for operatively connecting said flywheel and said movable die to move the latter eccentrically of said stationary die, said last named means including a cam member disposed coaxially with and mounted for rotation about the axis of said stationary die, said cam member having an eccentric cam surface thereon, and means engaging said cam surface and effective upon rotation of said cam member to move said movable die eccentrically of said stationary die.

2. A shearing mechanism for cutting tubular members comprising a frame, a stationary external die, means mounting said die on said frame, a movable external die mounted on said frame for movement eccentrically of said stationary die, a flywheel disposed coaxially with said stationary die and having an opening axially thereof adapted to receive therethrough a tubular member to be cut, motive means for driving said flywheel, and means including clutch means for operatively connecting said flywheel and said movable die to move the latter eccentrically of said stationary die, said last named means including a cam member disposed coaxially with and mounted for rotation about the axis of said stationary die, said cam member having an eccentric cylindrical recess receiving said movable die whereby rotation of said cam member is effective to move said movable die eccentrically of said stationary die.

3. A shearing mechanism for cutting tubular members comprising a frame, a stationary external die and a movable external die, a flywheel disposed coaxially with said stationary die and having an opening axially therethrough, a stationary tubular shaft having an end secured to said frame and extending through said opening in said flywheel and supporting said stationary die at the other end thereof, a sleeve member rotatably mounted on said shaft and extending through said opening in said flywheel, selectively operable means for connecting said sleeve member for rotation with said flywheel, a cylindrical cam member journalled on the other end of said tubular shaft and having an eccentric cam surface, means engaging said cam surface and effective upon rotation of said cam member to move said movable die eccentrically of said stationary die, and means operatively connecting said cam member to said sleeve member for rotation therewith.

4. A shearing mechanism for cutting tubular members comprising a frame, a stationary external die and a movable external die, a flywheel disposed coaxially with said stationary die and having an opening axially therethrough, a stationary tubular shaft having an end secured to said frame and extending through said opening in said flywheel and supporting said stationary die at the other end thereof, a sleeve member rotatably mounted on said shaft and extending through said opening in said flywheel, selectively operable means for connecting said sleeve member for rotation with said flywheel, a cylindrical cam member journalled on the other end of said tubular shaft and operatively connected to said sleeve member for rotation therewith, said cam member having an end portion extending beyond said other end of said tubular shaft and defining an eccentric cylindrical recess extending axially inwardly of said end portion, a movable die holder carrying said movable die and having a cylindrical portion rotatably fitting said eccentric recess whereby rotation of said cam member is effective to move said movable die eccentrically of said stationary die.

5. A shearing mechanism for cutting tubular members comprising a frame, a stationary external die, means mounting said die on said frame, a movable external die mounted on said frame for movement eccentrically of said stationary die, a flywheel disposed coaxially with said stationary die and having an opening axially thereof adapted to receive therethrough a tubular member to be cut, motive means for driving said flywheel, and means including clutch means for operatively connecting said flywheel and said movable die to move the latter eccentrically of said stationary die, said last named means including a cam member disposed coaxially with and mounted for rotation about the axis of said stationary die, said cam member having an eccentric cylindrical recess in its outer end, a movable die holder having a cylindrical portion rotatably fitting said recess and carrying said movable die in eccentric relation to said cylindrical portion so that said movable die is aligned with said stationary die when said die holder is in a predetermined rotative position relative to said cam member.

6. A shearing mechanism for cutting tubular members comprising a frame, a stationary external die, means mounting said die on said frame, a movable external die mounted on said frame for movement eccentrically of said stationary die, a flywheel disposed coaxially with said stationary die and having an opening axially thereof adapted to receive therethrough a tubular member to be cut, motive means for driving said flywheel, means including clutch means for operatively connecting said flywheel and said movable die to move the latter eccentrically of said stationary die, said last named means including a cam member disposed coaxially with and mounted for rotation about the axis of said stationary die, said cam member having an eccentric cylindrical recess in its outer end, a movable die holder having a cylindrical portion rotatably fitting said recess and carrying said movable die in eccentric relation to said cylindrical portion so that said movable die is aligned with said stationary die when said die holder is in a predetermined rotative position relative to said cam member, and means for preventing rotation of said die holder with said cam member upon rotation of the latter.

JOHN F. DAUKUS.

REFERENCES CITED

The following references are of record in the file of this patent:

UNITED STATES PATENTS

| Number | Name | Date |
|---|---|---|
| 1,635,807 | Amberg | July 12, 1927 |